US011345410B2

(12) United States Patent
Shinohara

(10) Patent No.: US 11,345,410 B2
(45) Date of Patent: May 31, 2022

(54) WORK VEHICLE

(71) Applicant: KUBOTA CORPORATION, Osaka (JP)

(72) Inventor: Makoto Shinohara, Osaka (JP)

(73) Assignee: KUBOTA CORPORATION, Osaka (JP)

(*) Notice: Subject to any disclaimer, the term of this patent is extended or adjusted under 35 U.S.C. 154(b) by 275 days.

(21) Appl. No.: 16/646,327

(22) PCT Filed: Oct. 22, 2018

(86) PCT No.: PCT/JP2018/039121
§ 371 (c)(1),
(2) Date: Mar. 11, 2020

(87) PCT Pub. No.: WO2019/082829
PCT Pub. Date: May 2, 2019

(65) Prior Publication Data
US 2020/0269929 A1    Aug. 27, 2020

(30) Foreign Application Priority Data

Oct. 23, 2017   (JP) ............................. JP2017-204558
Oct. 23, 2017   (JP) ............................. JP2017-204559

(51) Int. Cl.
*B62D 25/08* (2006.01)
*B60K 1/04* (2019.01)
*B60R 16/04* (2006.01)
*B62D 21/18* (2006.01)
*B62D 27/04* (2006.01)
(Continued)

(52) U.S. Cl.
CPC ............. *B62D 25/088* (2013.01); *B60K 1/04* (2013.01); *B60R 16/04* (2013.01); *B62D 21/18* (2013.01); *B62D 27/04* (2013.01); *B62D 49/00* (2013.01); *F16F 15/02* (2013.01); *B60K 2001/0411* (2013.01)

(58) Field of Classification Search
CPC ...... B62D 25/088; B62D 21/18; B62D 27/04; B62D 49/00; B62D 33/0617;
(Continued)

(56) References Cited

U.S. PATENT DOCUMENTS

2004/0205953 A1\* 10/2004 Marume ............. B25B 27/0035
29/281.1

FOREIGN PATENT DOCUMENTS

CN    110168174 A  \*  8/2019 ................ E02F 3/76
JP    56-143971 U    10/1981
(Continued)

OTHER PUBLICATIONS

Official Communication dated Jan. 15, 2019 in International Patent Application No. PCT/JP2018/039121.
(Continued)

*Primary Examiner* — Pinel E Romain
(74) *Attorney, Agent, or Firm* — Greenblum & Bernstein, P.L.C.

(57) ABSTRACT

A vehicle includes a dynamic shock absorbing mechanism provided in a cabin. The dynamic shock absorbing mechanism includes a weight support member transversely supported at an upper portion of a cabin frame and extending along a transverse width of a vehicle body; and a weight member supported at a center portion in the vehicle body transverse width direction of the weight support member. The weight support member is an elastic member that has a smaller elastic modulus than an elastic modulus of the cabin frame.

7 Claims, 7 Drawing Sheets

(51) Int. Cl.
 *B62D 49/00* (2006.01)
 *F16F 15/02* (2006.01)
(58) Field of Classification Search
 CPC .................. B62D 33/0604; B60K 1/04; B60K 2001/0411; B60R 16/04; F16F 15/02; E02F 9/166
 USPC .................................................... 296/203.01
 See application file for complete search history.

(56) References Cited

FOREIGN PATENT DOCUMENTS

| | | |
|---|---|---|
| JP | 59-32543 | 2/1984 |
| JP | 6-67557 | 9/1994 |
| JP | 2002-356184 | 12/2002 |
| JP | 2005-29127 | 2/2005 |
| JP | 2005-349913 | 12/2005 |
| JP | 2007308030 A * | 11/2007 |
| JP | 2008-80872 | 4/2008 |
| JP | 2008-195175 A | 8/2008 |
| JP | 2011-25844 | 2/2011 |
| JP | 2014-125107 | 7/2014 |

OTHER PUBLICATIONS

JPO Office Action dated May 12, 2020 in JP 2017-204558.
JPO Office Action dated May 12, 2020 in JP 2017-204559.
Extended European Search Report issued in European Patent Application No. 18871397.8 dated Jul. 2, 2021.

* cited by examiner

WORK VEHICLE

TECHNICAL FIELD

The present invention relates to a work vehicle such as a tractor.

BACKGROUND ART

Background Art 1

With a tractor (an example of a "work vehicle") disclosed in Patent Literature 1, a cabin is supported to a traveling vehicle body via a cushion member to cover a driving section. At front and rear portions on the right and left sides of the cabin, a cabin frame is supported to cabin brackets via antivibration rubber members.

Background Art 2

A tractor (an example of a "work vehicle") according to Patent Literature 2 includes a vehicle body frame having an extension frame portion extending in one direction in the front/rear direction, and a battery supported to the extension frame portion. At a front portion of the traveling vehicle body, there is provided a front frame, to which an engine is supported. On the vehicle-body front side of the engine, a battery is supported to the front frame. The battery is disposed on a support plate fixedly welded to the front frame, thus being supported to the front frame via the support plate.

PRIOR ART DOCUMENTS

Patent Literatures

Patent Literature 1: JP 2011-025844 A
Patent Literature 2: JP 2014-125107 A

SUMMARY OF THE INVENTION

Problem to be Solved by the Invention

[Problem 1] (Corresponding to "Background Art 1")

With the above-described work vehicle, vibration transmission from the traveling vehicle body to the cabin can be suppressed by the cushion member. However, depending on nature of vibration of the traveling vehicle body, resonance of the cabin may occur. Such resonating vibration of the cabin leads to deterioration in riding comfort.

Then, there is a need for a work vehicle that allows reduction of resonating vibration of the cabin with a simple arrangement.

[Problem 2] (Corresponding to "Background Art 2")

If the resonance frequency of the vehicle body frame is in agreement with the frequency of an engine-generated vibration or the frequency of vibration of the traveling device, vibration noise is generated. In case a special dynamic vibration absorber is mounted on the vehicle body frame, for reducing vibration of the vehicle body frame, a significant mass (weight) will be required, thus leading to increased size of the vehicle body as well as increased cost.

Then, there is a need for a work vehicle that allows reduction in the vibration of the vehicle body frame, while avoiding size increase of the vehicle body, as well as cost increase thereof.

Means for Solving Problem

[Solution 1] (Corresponding to "Problem 1")

Herein, there is proposed a work vehicle comprising:
a traveling vehicle body;
a driving section formed on the traveling vehicle body;
a cabin having a cabin frame and covering the driving section;
a cushion member interposed between the traveling vehicle body and the cabin supported to the traveling vehicle body;
wherein the cabin includes a dynamic shock absorbing mechanism having a weight support member transversely supported at an upper portion of the cabin frame and extending along a transverse width of the vehicle body, and a weight member supported at a center portion in the vehicle body transverse width direction of the weight support member; and
the weight support member comprises an elastic member that has a smaller elastic modulus than an elastic modulus of the cabin frame.

With the above-described arrangement, by appropriately setting the elastic modulus of the weight support member and the mass of the weight member, while taking into consideration the resonance frequency of the cabin which is determined by the weight of the cabin and the rigidity of the antivibration mount, in the event of resonance vibration of the cabin, the weight member will be vibrated with the inverted phase (antiphase) or a phase near the inverted phase, thus absorbing the cabin vibration.

Thus, with the simple arrangement of additionally providing the weight support member and the weight member, cabin vibration can be effectively reduced.

According to one preferred embodiment:
the dynamic shock absorbing mechanism includes:
a front-facing elastic support member extending forwardly along the vehicle body front/rear direction from the center portion in the vehicle body transverse width direction and having a smaller elastic modulus than the elastic modulus of the cabin frame; and
a rear-facing elastic support member extending rearwardly along the vehicle body front/rear direction from the center portion and having a smaller elastic modulus than the elastic modulus of the cabin frame; and
the weight member includes:
a front weight member supported to the center portion via the front-facing elastic support member; and
a rear weight member supported to the center portion via the rear-facing elastic support member.

With the above-described arrangement, when resonance vibration occurs in the cabin in response to pitching and bouncing of the traveling vehicle body, the front weight member and the rear weight member will be elastically deformed and vibrated with the inverted or near-inverted phase, thereby to absorb the cabin vibration. When resonance vibration of the cabin occurs in response to rolling of the traveling vehicle body, the front weight member and the rear weight member again will be elastically deformed and vibrated with the inverted or near-inverted phase, thereby to absorb the cabin vibration. In this way, in the event of any one of pitching, bouncing and rolling of the traveling vehicle body, cabin vibration can be effectively reduced.

According to one preferred embodiment:
the cabin includes a roof portion; and
the dynamic shock absorbing mechanism is accommodated within the roof portion.

With the above-described arrangement, the roof portion is utilized as a "cover" for the dynamic shock absorbing mechanism, so that the dynamic shock absorbing mechanism can be covered in an inexpensive manner.

According to one preferred embodiment:

the work vehicle further comprises a pair of right and left air-conditioning ducts accommodated in distribution within opposed sides of the roof portion and extending along the vehicle body front/rear direction; and the weight member of the dynamic shock absorbing mechanism is accommodated between the pair of right and left air-conditioning ducts in the roof portion.

With the above-described arrangement, since the free space available between the air-conditioning ducts is effectively utilized as a space for accommodating the weight member, it is possible to utilize the roof portion as the cover for the dynamic shock absorbing mechanism, while avoiding increase in the thickness of the roof portion for the purpose of accommodation of the dynamic shock absorbing mechanism.

[Solution 2] (Corresponding to "Problem 2")

Here, there is proposed a work vehicle comprising:

an engine;

a vehicle body frame including an engine coupling portion to which the engine is coupled, and an extension frame portion extending forwardly or rearwardly in the vehicle body front/rear direction from the engine coupling portion;

a battery supported to the extension frame portion; and an antivibration member interposed between the extension frame portion and the battery.

With the above-described arrangement, by appropriately setting the spring constant of the antivibration member with taking into consideration the resonance frequency of the vehicle body frame and the weight of the battery, when the resonance vibration of the vehicle body frame is in agreement with the frequency of an engine-generated vibration or the frequency of the vibration of the traveling device, the battery will be vibrated with the inversed or near-inverted phase to generate a reaction force resisting the vibration. Namely, the battery can be effectively utilized as a "weight" of the dynamic shock absorbing mechanism.

As the battery supported to the extension frame portion is disposed at a position near the leading end of this extension frame portion which forms the "body" of the vehicle body frame vibration, this battery can effectively achieve its function as the "weight" of the dynamic shock absorbing mechanism.

Therefore, there is no need for providing a dedicated dynamic shock absorber, since anti-vibration supporting arrangement of the battery can function as such instead. Consequently, vibration of the vehicle body frame can be effectively reduced while avoiding enlargement of the vehicle body and significant cost increase.

According to one preferred embodiment:

the antivibration member is interposed between the extension frame member and the battery while receiving and supporting the battery from under.

With the above-described arrangement, the battery can be easily moved pivotally with using the antivibration member as the pivot. Thus, this arrangement allows the battery to function as the weight of the dynamic shock absorbing mechanism easily.

According to one preferred embodiment;

the work vehicle further comprises:

a battery mount on which the battery is placed; and a fixing tool coupled to the battery and also to the battery mount for fixing the battery to the battery mount;

wherein the antivibration member is interposed between the extension frame portion and the battery mount to which the battery is fixed via the fixing tool.

With the above-described arrangement, the battery is fixed to the battery mount via the fixing tool which is coupled to the battery and the battery mount. Thus, in comparison with an arrangement of such fixing tool being coupled to the battery and the vehicle body frame, vibration of the battery can be facilitated as the fixing tool does not interfere with the battery vibration. Namely, it is readily possible to allow the battery to function as the weight of the dynamic shock absorber.

Further and other features and advantages resulting therefrom will become apparent upon reading following detailed description.

EMBODIMENTS OF THE INVENTION

First Embodiment

A first embodiment will be described hereinafter. In the instant embodiment, a tractor is an example of a "work vehicle".

Figure 1:
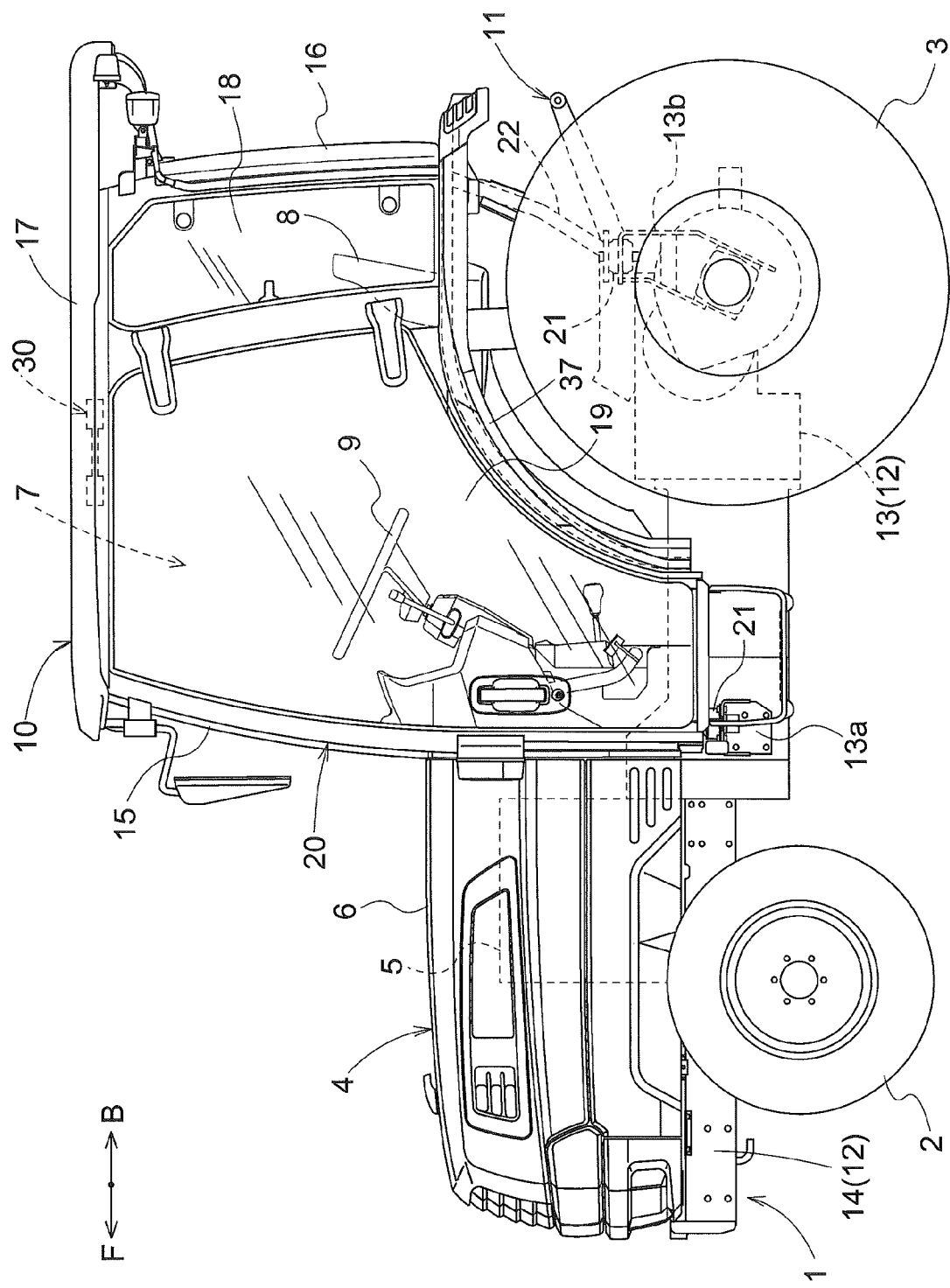
FIG. 1 is a left side view showing a first embodiment (same is true to subsequent drawings up to FIG. 7), showing a tractor as a whole.

FIG. 1 is a left side view showing the tractor as a whole. As shown in FIG. 1, the direction [F] is defined as the front (forward) direction of a traveling vehicle body 1, the direction [B] is defined as the rear (rearward) direction of the traveling vehicle body 1, the direction on the near side of the illustration is defined as the left direction of the traveling vehicle body 1, and the direction on the far side of the illustration is defined as the right direction of the traveling vehicle body 1, respectively.

As shown in FIG. 1, the tractor includes the traveling vehicle body 1 that mounts a pair of right and left front wheels 2 steerably and drivably, and a pair of right and left rear wheels 3 drivably.

In the traveling vehicle body 1, there are formed an engine section 4 and a driving section 7. More particularly, in the engine section 4 formed at a front portion of the traveling vehicle body 1, there are provided an engine 5, an engine hood 6 covering the engine 5, etc. In a driving section 7 formed at a rear portion of the traveling vehicle body 1, there are provided a driver's seat 8 and a steering wheel 9 for steering the front wheels 2. The driving section 7 is covered by a cabin 10 which is supported to the traveling vehicle body 1. At a rear portion of the traveling vehicle body 1, a link mechanism 11 is provided to be liftable up/down.

For instance, when a rotary cultivator device (not shown) is liftably coupled to the rear portion of the traveling vehicle body 1 via the link mechanism 11, the tractor will constitute a riding cultivator machine.

A vehicle body frame 12 of the traveling vehicle body 1 is constituted of the engine 5, a transmission case 13 having its front portion coupled to the rear portion of the engine 5, and a front frame 14 extending forwardly of the vehicle body from a lower portion of the engine 5. The right and left front wheels 2 are supported to the front frame 14 via a front wheel drive case (not shown). The right and left rear wheels 3 are supported to rear portions of the transmission case 13. In operation, power from the engine 5 is inputted to the transmission case 13 and then transmitted from this transmission case 13 to the right and left rear wheels 2. The power inputted to the transmission case 13 will be outputted from the transmission case 13 in the vehicle body forward direction to be inputted to the front wheel drive case and then transmitted from this front wheel drive case to the right and left front wheels 2.

As shown in FIG. 1, the cabin 10 includes a cabin frame 20, a front glass 15 mounted to a front portion of the cabin frame 20, a rear glass 16 mounted to a rear portion of the cabin frame 20, a roof portion 17 mounted to an upper portion of the cabin frame 20, and side glasses 18 mounted to opposed transverse portions of the cabin 10. Access doors 19 on the right and left sides are provided forwardly of the respective side glasses 18 to be pivotally opened/closed.

As shown in FIG. 1, cabin supporting portions 13a are formed at two, front and rear, positions on the left side of the transmission case 13 and at two, front and rear, positions on the right side thereof. And, to these cabin supporting portions 13a provided at the four positions, the lower portion of the cabin frame 20 is supported via cushion rubbers 21 (an example of a "cushion member"), so that the cabin 10 is supported to the traveling vehicle body 1 via the cushion rubbers 21 at the four positions, i.e. the left front position, the left rear position, the right front position and the right rear position. Transmission of vibration from the traveling vehicle body 1 to the cabin 10 is suppressed (damped) by the cushion rubbers 21.

Incidentally, in the instant embodiment, the cushion rubbers 21 are provided at four positions. However, such cushion rubbers 21 may be provided at more positions than four positions. Further, in the instant embodiment, as the cushion member interposed between the traveling vehicle body 1 and the cabin 10, the cushion rubbers 21 are employed. However, instead thereof, any other kind of cushion member such as a spring may be used.

As shown in FIG. 1, at an upper portion of the cabin 10, there is provided a dynamic shock absorbing mechanism 30. Namely, resonance vibration occurring in the cabin 10 in response to vibration of the traveling vehicle body 1 will be reduced or damped by this dynamic shock absorbing mechanism 30. More particularly, this mechanism is constructed as follows.

Figure 2:
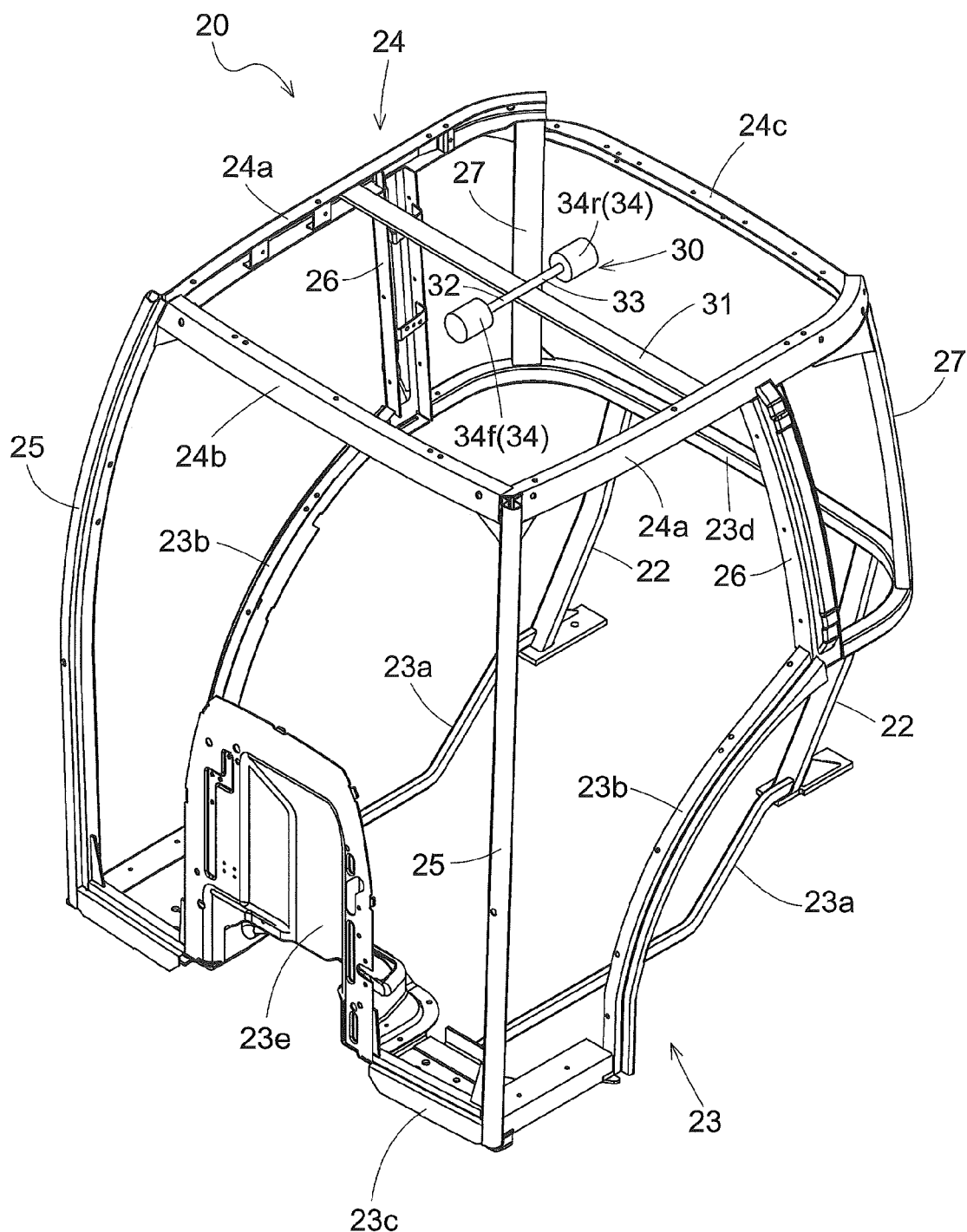
FIG. 2 is a perspective view showing a cabin frame and a dynamic shock absorbing mechanism.

As shown in FIG. 2, the cabin frame 20 includes a lower frame 23, an upper frame 24, a pair of right and left front vertical frames 25, a pair of right and left intermediate vertical frames 26, and a pair of right and left rear frames 27. The lower frame 23 is coupled to the cabin supporting portions 13a at the four positions via the cushion rubbers 21.

As shown in FIG. 2, the lower frame 23 includes a pair of right and left intermediate frames 23a extending in the vehicle body front/rear direction, and a pair of right and left lower side frames 23b extending in the vehicle body front/rear direction. The intermediate portion in the front/rear direction of each one of the right and left lower side frames 23b is formed arcuate to follow the contour of a rear wheel fender 37 (see FIG. 1). To and between front portions of the right and left lower side frames 23b, a front coupling frame 23c is coupled. This front coupling frame 23c includes a front shielding wall portion 23e for shielding the engine room and the driving section 7 from each other. To and between rear portions of the right and left lower side frames 23b, a rear coupling frame 23d is coupled. To and between rear portions of the right and left intermediate frames 23a and the rear coupling frame 23d, pillar frames 22 are coupled.

As shown in FIG. 2, the upper frame 24 includes a pair of right and left upper side frames 24a extending in the vehicle body front/rear direction. To and between the front end portions of the right and left upper side frames 24a, a front coupling frame 24b is coupled. To and between the rear end portions of the right and left upper side frames 24a, a rear coupling frame 24c is coupled.

As shown in FIG. 2, at the front left corner portion and the front right corner portion of the cabin frame 20, the lower frame 23 and the upper frame 24 are coupled to each other via front vertical frames 25. An intermediate portion in the front/rear direction of the respective lower side frame 23b and an intermediate portion in the front/rear direction of the respective upper side frame 24a are coupled to each other via the intermediate vertical frame 26. At the rear left corner portion and the rear right corner portion of the cabin frame 20, the lower frame 23 and the upper frame 24 are coupled to each other via rear vertical frames 27.

As shown in FIG. 2, the dynamic shock absorbing mechanism 30 includes a weight support member 31 extending in the vehicle body transverse direction, a front-facing elastic support member 32, a rear-facing elastic support member 33, and a front weight member 34f and a rear weight member 34r which function together as a weight member 34.

The weight support member 31 is coupled to/between the intermediate portions in the front/rear direction of the upper side frames 24a of the upper frame 24 and is supported horizontally and transversely at an upper portion of the cabin frame 20. The front-facing elastic support member 32 extends forwardly of the vehicle body in the vehicle body front/rear direction from the intermediate portion in the vehicle body transverse direction of the weight support member 31. The rear-facing elastic support member 33 extends rearwardly of the vehicle body in the vehicle body front/rear direction from the intermediate portion in the vehicle body transverse direction of the weight support member 31. The weight support member 31, the front-facing elastic support member 32 and the rear-facing elastic support member 33 are formed of elastic member having a smaller elastic modulus than elastic modulus of the lower frame 23, the upper frame 24, the front vertical frame 25, the intermediate vertical frames 26 and the rear vertical frame 27 of the cabin frame 20. In the instant embodiment, the weight support member 31 is constituted of a band-plate member. However, it is not limited to such band-plate member, but any one of various kinds of member, such as a round bar member, an angular bar member, etc. may be employed. In the instant embodiment, the front-facing elastic support member 32 and the rear-facing elastic support member 33 are constituted of round bar members. However, various kinds of members such as angular bar members, plate members, etc. may be employed instead. As the weight support member 31, the front-facing elastic support member 32 and the rear-facing elastic support member 33, it is possible to employ metal members or resin members.

The front weight member 34f is supported to the extension end portion of the front-facing elastic support member 32 and is supported to an intermediate portion in the vehicle body transverse direction of the weight support member 31 via the front-facing elastic support member 32. The rear weight member 34r is supported to the extension end portion of the rear-facing elastic support member 33 and is supported to an intermediate portion in the vehicle body transverse direction of the weight support member 31 via the rear-facing elastic support member 33. As the front weight member 34f and the rear weight member 34r, it is possible to employ metal members or resin members.

Suppose a resonance frequency (the frequency determined by the weight of the cabin 10 and the rigidity of the cushion rubbers 21 provided at the four positions) of the cabin 10 in agreement with the vibration of the traveling vehicle body 1 is represented by a sign "F"; a total weight of the mass of the front weight member 34f and the mass of the rear weight member 34r is represented by a sign "m"; and a spring constant to be provided by the weight support member 31 is represented by a sign "K1".

Then, the spring constant K1 will be set to establish:

$$F = \frac{1}{2}\pi \times \mathrm{SQRT}(K1/m)$$

Further, suppose the spring constant of the front-facing elastic support member 32 and the spring constant of the rear-facing elastic support member 33 are represented respectively by a sign "K2".

Then, the spring constant K2 will be set to establish:

$$F = \frac{1}{2}\pi \times \mathrm{SQRT}(K2/m)$$

where, "SQRT ( )" is a function representing a square root.

Figure 5:
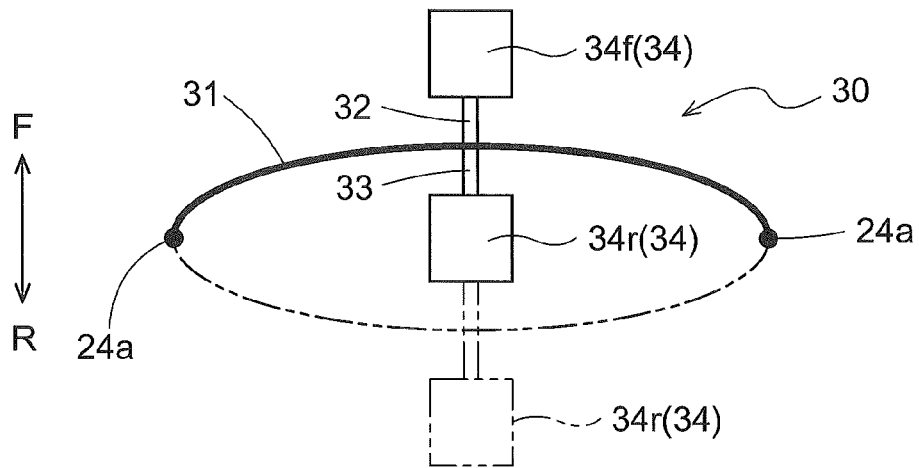
FIG. 5 is an explanatory view illustrating an operation of the dynamic shock absorbing mechanism.

FIG. 5 is an explanatory view (view seen from the above) illustrating an operation of the dynamic shock absorbing mechanism 30 when resonance vibration occurs in response to pitching of the traveling vehicle body 1. In FIG. 5, the direction of [F] represents the forward (front) direction of the traveling vehicle body 1, and the direction of [B] represents the rearward (rear) direction of the traveling vehicle body 1. As shown in FIG. 5, when resonance vibration occurs in the cabin 10 in response to pitching of the traveling vehicle body 1, the front weight member 34f and the rear weight member 34r will elastically deform the weight support member 31, while being vibrated with the inverted phase or near-inverted phase relative to that of the cabin 10 simultaneously. So that, the vibration of the cabin 10 is absorbed by the vibrations of the front weight member 34f and the rear weight member 34r.

Figure 6:
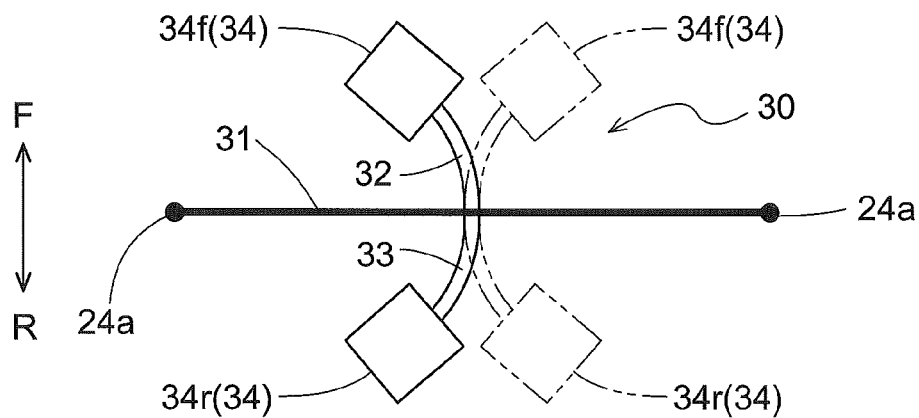
FIG. 6 is another explanatory view illustrating the operation of the dynamic shock absorbing mechanism.

FIG. 6 is an explanatory view (view seen from the above) illustrating an operation of the dynamic shock absorbing mechanism 30 when resonance vibration occurs in response to rolling of the traveling vehicle body 1. In FIG. 6, the direction of [F] represents the forward (front) direction of the traveling vehicle body 1, and the direction of [B] represents the rearward (rear) direction of the traveling vehicle body 1. As shown in FIG. 6, when resonance vibration occurs in the cabin 10 in response to rolling of the traveling vehicle body 1, the front weight member 34f and the rear weight member 34r will elastically deform the front-facing elastic support member 32 and the rear-facing elastic support member 33, while being vibrated with the inverted phase or near-inverted phase relative to that of the cabin 10 simultaneously. So that, the vibration of the cabin 10 is absorbed by the vibrations of the front weight member 34f and the rear weight member 34r.

Figure 7:
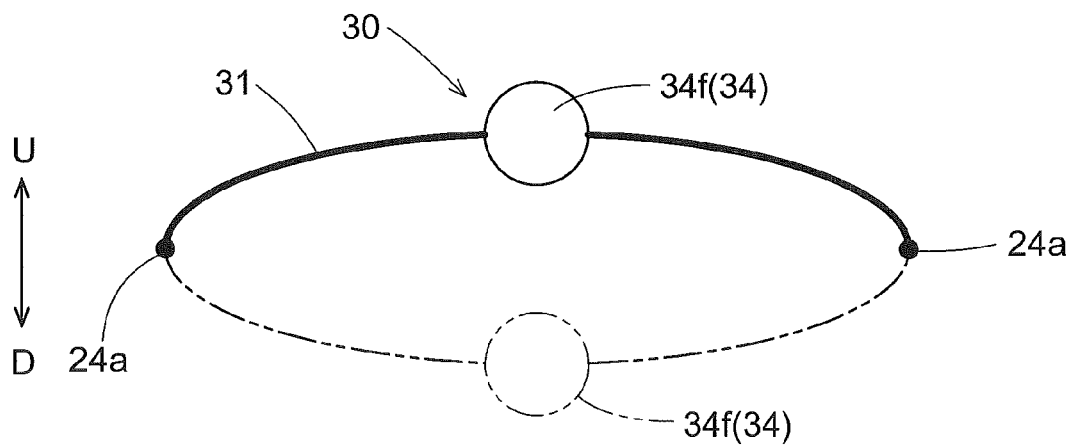
FIG. 7 is yet another explanatory view illustrating the operation of the dynamic shock absorbing mechanism.

FIG. 7 is an explanatory view (view seen from the front) illustrating an operation of the dynamic shock absorbing mechanism 30 when resonance vibration occurs in response to bouncing of the traveling vehicle body 1. In FIG. 7, the direction of [U] represents the upward direction of the traveling vehicle body 1, and the direction of [D] represents the downward direction of the traveling vehicle body 1. As shown in FIG. 7, when resonance vibration occurs in the cabin 10 in response to bouncing of the traveling vehicle body 1, the front weight member 34f and the rear weight member 34r will elastically deform the weight support member 31, while being vibrated with the inverted phase or near-inverted phase relative to that of the cabin 10 simultaneously. So that, the vibration of the cabin 10 is absorbed by the vibrations of the front weight member 34f and the rear weight member 34r.

Figure 3:
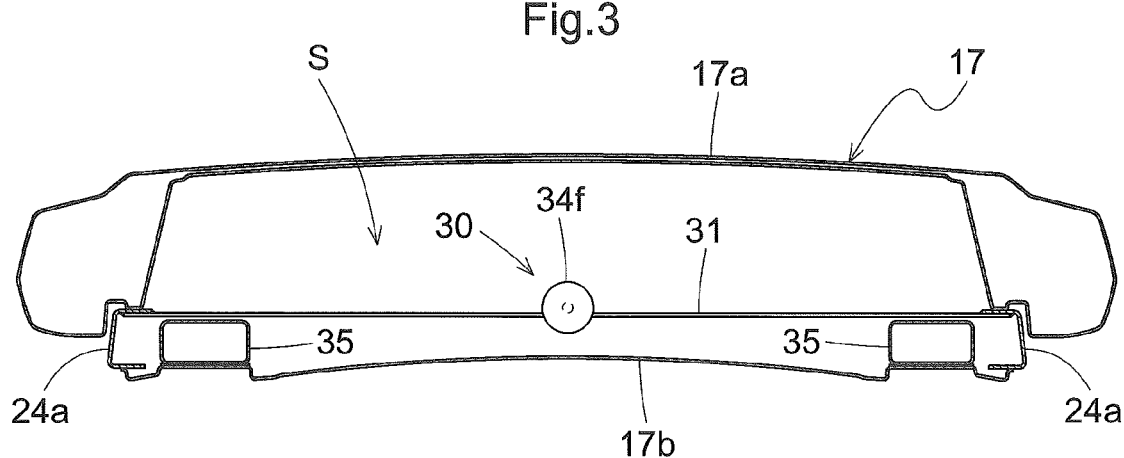
FIG. 3 is a front view showing the dynamic shock absorbing mechanism.
Figure 4:
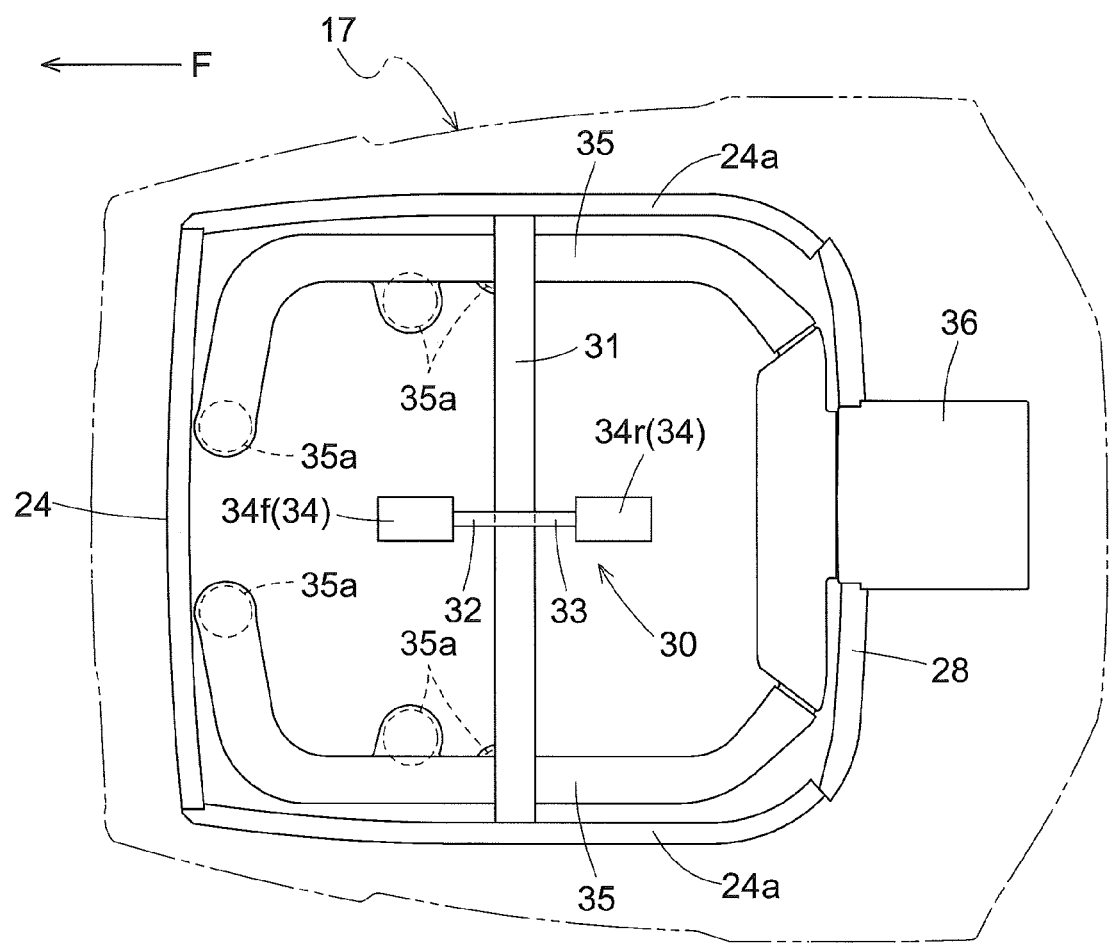
FIG. 4 is a plan view showing the dynamic shock absorbing mechanism.

As shown in FIG. 3, a roof portion 17 includes an outer roof 17a and an inner roof 17b. The outer roof 17a and the inner roof 17b together form an inner space S of the roof portion 17. As shown in FIG. 3 and FIG. 4, an air-conditioning duct 35 is accommodated within each of right and left side portions of the inner space S. The right and left air-conditioning ducts 35 are accommodated as extending along the vehicle body front/rear direction. And, conditioning air is supplied from an air conditioning device 36 that is provided at a rear portion of the roof portion 17, and the supplied conditioning air is supplied to the driving section 7 via outlets 35a.

As shown in FIG. 3 and FIG. 4, the dynamic shock absorbing mechanism 30 is accommodated within the inner space S, with the front weight member 34f and the rear weight member 34r being disposed between the right and left air-conditioning ducts 35, and the dynamic shock absorbing mechanism 30 is covered by the outer roof 17a and the inner roof 17b.

Modified Embodiments of First Embodiment (1) In the foregoing embodiment, the front weight member 34f is supported to the weight support member 31 via the front-facing elastic support member 32, and the rear weight member 34r is supported to the weight support member 31 via the rear-facing elastic support member 33. Instead thereof, it is possible employ an arrangement in which the weight member 34 is directly supported to the center portion of the weight support member 31, with omitting the front-facing elastic support member 32 and the rear-facing elastic support member 33.

(2) In the foregoing embodiment, the dynamic shock absorbing mechanism 30 is accommodated inside the roof portion 17 of the cabin 10. Instead thereof, the dynamic shock absorbing mechanism 30 may be provided outside the roof portion 17 and a dedicated cover may be provided for covering the dynamic shock absorbing mechanism 30 only.

(3) In the foregoing embodiment, the work vehicle is a tractor. However, the present invention is applicable to another cabin-mounted vehicle such as a combine and a transport vehicle.

Second Embodiment

A second embodiment will be described next hereinafter. In the instant embodiment, a tractor is employed as an example of the work vehicle.

Figure 8:
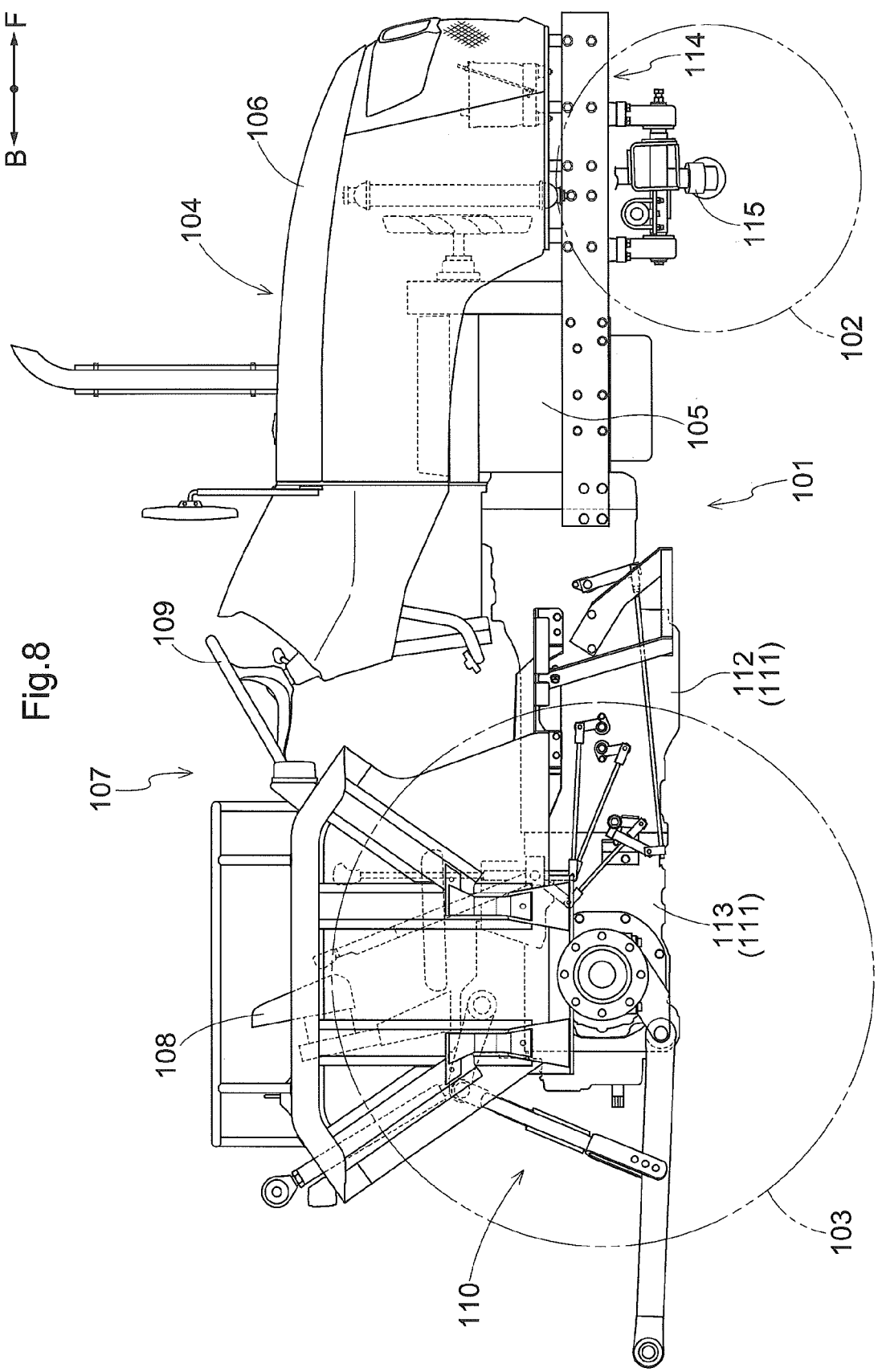
FIG. 8 is a right side view showing a second embodiment (same is true to subsequent drawings up to FIG. 10), showing a tractor as a whole.

FIG. 8 is a right side view showing the tractor as a whole. As shown in FIG. 8, the direction [F] is defined as the front (forward) direction of a traveling vehicle body 101, the direction [B] is defined as the rear (rearward) direction of the traveling vehicle body 101, the direction on the near side of the illustration is defined as the right direction of the traveling vehicle body 101, and the direction on the far side of the illustration is defined as the left direction of the traveling vehicle body 101, respectively.

As shown in FIG. 8, the tractor includes a traveling vehicle body 101 that mounts a pair of right and left front wheels 102 steerably and drivably, and a pair of right and left rear wheels 103 drivably. An engine section 104 is provided at a front portion of the traveling vehicle body 101. In the engine section 104, there are provided an engine 105, an engine hood 106 for covering the engine 105, etc. At a rear portion of the traveling vehicle body 101, a driving section 107 is provided. In the driving section 107, there are provided a driver's seat 108, a steering wheel 109 for steering the front wheels 102, etc. At a rear portion of the traveling vehicle body 101, a link mechanism 110 is provided to be liftable up/down.

When a rotary cultivator device (not shown) is liftably coupled to the rear portion of the traveling vehicle body 101 via the link mechanism 110, for instance, the tractor will constitute a riding cultivator machine.

Figure 9:
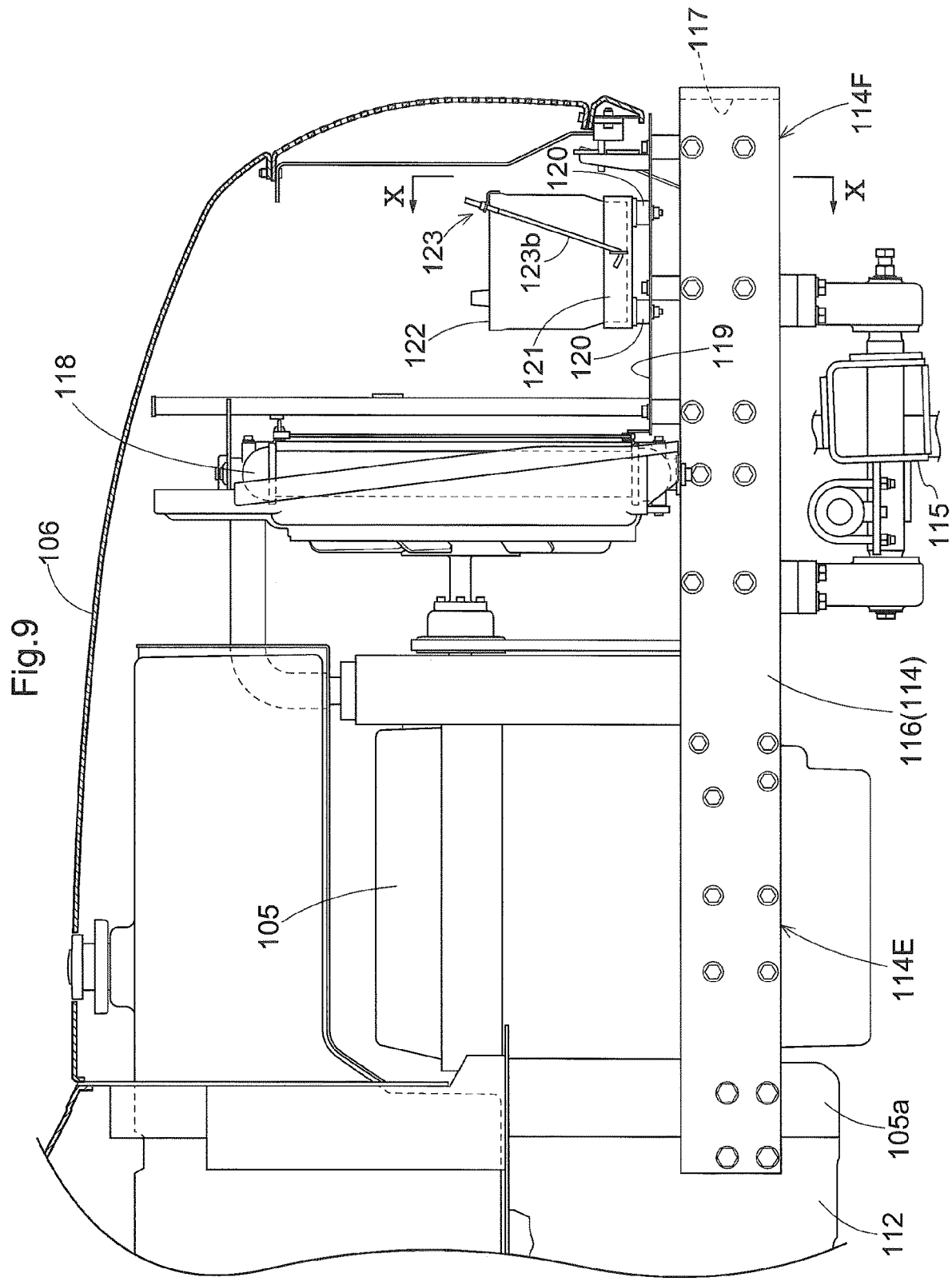
FIG. 9 is a right side view showing a battery mounting portion.

As shown in FIG. 8 and FIG. 9, a vehicle body frame 111 of the traveling vehicle body 101 is constituted of the engine 105, a front transmission case 112 having its front portion coupled to a rear portion of a clutch housing 105a provided at a rear portion of the engine 105, a rear transmission case 113 having its front portion coupled to a rear portion of the front transmission case 112, and a front frame 114 coupled to a lower portion of the engine 105. On the opposed transverse sides of the rear transmission case 113, the rear wheels 103 are provided to be drivable. In operation, power from the engine 105 is transmitted to the front wheels 102 and the rear wheels 103 via the front transmission case 112 and the rear transmission case 113, respectively. A front-wheel driving power outputted from the front transmission case 112 is transmitted to the right and left front wheels 102 via a front wheel drive case 115.

Figure 10:
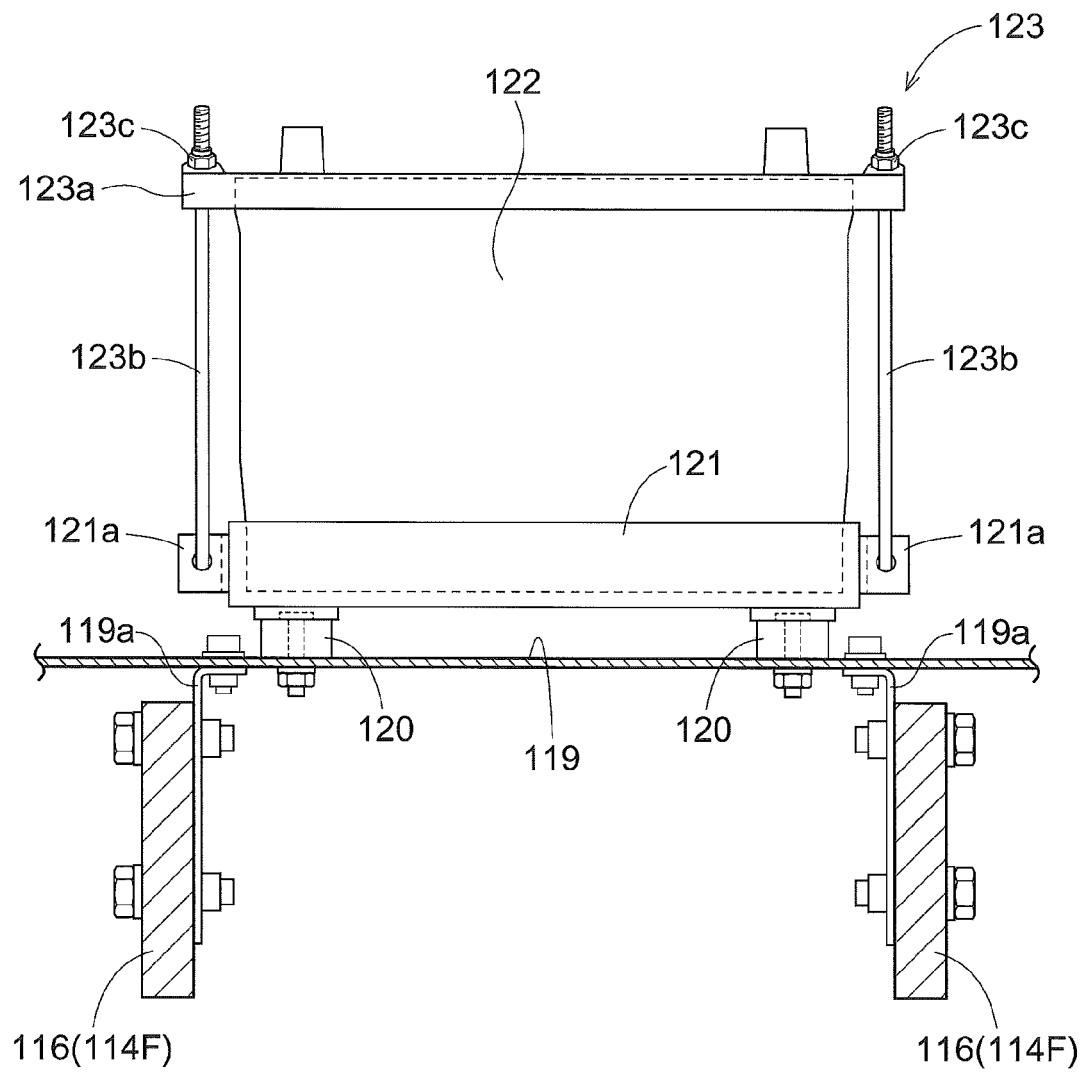
FIG. 10 is a view taken along X-X section in FIG. 9

The front frame 114 corresponds to the "vehicle body frame" relating to the present invention. As shown in FIG. 9 and FIG. 10, the front frame 114 includes a pair of right and left frame members 116 having respective rear portions thereof coupled to lower portions on the right and left sides of the engine 105, respectively. To and between the front end portion of the left frame member 116 and the front end portion of the right frame member 116, a coupling frame member 117 is coupled; and thus, the front frame 114 is provided as a framework.

The left frame member 116 includes a left engine coupling portion that is coupled to the left transverse lower portion of the engine 105 and supported by the engine 105; and a left extension frame portion extending forwardly of the vehicle body from the left engine coupling portion. The right frame member 116 includes a right engine coupling portion that is coupled to the right transverse lower portion of the engine 105 and supported by the engine 105; and a right extension frame portion extending forwardly of the vehicle body from the right engine coupling portion. The rear end portion of the left engine coupling portion of the left frame member 116 and the rear end portion of the right engine coupling portion of the right frame member 116 extend to the respective front portions of the front transmission case 112 to be coupled to this front transmission case 112. Thus, the front frame 114 includes an engine coupling portion 114E that is constituted of the left engine coupling portion of the left frame member 116 and the right engine coupling portion of the right frame member 116 to each be coupled to the engine 105. Further, the front frame 114 includes an extension frame portion 114F that is constituted of the left extension frame portion of the left frame member 116 and the right extension frame portion of the right frame member 116 to each extend forwardly of the vehicle body from the engine coupling portion 114E.

As shown in FIG. 9 and FIG. 10, to the extension frame portion 114F, an engine radiator 118 and a support plate 119 are supported. As shown in FIG. 10, mounting brackets 119a, provided on the right and left sides of the lower face of the support plate 119, are coupled to the frame member 116 with coupling bolts, whereby the support plate 119 is fixed to the extension frame portion 114F.

To the upper face side of the support plate 119, a battery mount 121 is supported via antivibration rubbers 120 each acting as an "antivibration member". The antivibration rubbers 120 are provided at portions adjacent four corners of the battery mount 121. Each of the antivibration rubbers 120 is provided in the form of a block; and is interposed between the upper face of the support plate 119 and the lower face of the battery mount 121, thus receiving and supporting the battery mount 121 from under.

On the battery mount 121, a battery 122 is mounted. The battery 122 is fixed to the battery mount 121 with a fixing tool 123. As shown in FIG. 9 and FIG. 10, the fixing tool 123 includes a battery pressing portion 123a and a pair of fastening rods 123b. In operation of the fixing tool 123, the battery pressing portion 123a is placed in abutment against and retained to the upper corner portion of the battery 122; and at the opposed end portions of the battery pressing portion 123a, the fastening rods 123b are attached to and between the battery pressing portion 123a and a supporting portion 121a of the battery mount 121. Then, with a fastening operation of a screw member 123c of each fastening rod 123b, the battery pressing portion 123a will be lowered by the pair of fastening rods 123b, and with this lowering force, the battery 122 will be pressed against and fixed to the battery mount 121.

The antivibration rubber 120, when interposed between the battery mount 121 and the support plate 119, is to be interposed between the battery 122 and the extension frame portion 114F. Namely, the battery 122 is supported to the extension frame portion 114F via the antivibration rubbers 120.

Suppose a resonance frequency of the front frame 114 in agreement with the engine vibration frequency or the lug vibration frequency of the front wheels 102 and the rear wheels 103 is represented by a sign "F"; the weight of the battery 122 is represented by a sign "m"; and a spring constant to be provided by the four antivibration rubbers 120 is represented by a sign "K".

Then, the spring constant K will be set to establish:

$$F = 1/2\pi \times \mathrm{SQRT}(K/m)$$

where, "SQRT ( )" is a function representing a square root.

When the resonance frequency of the front frame 114 is in agreement with the engine vibration frequency or the lug vibration frequency of the front wheels 102 and the lug vibration frequency of the rear wheels 103, the battery 122 will be vibrated with the inverted (or near-inverted) phase to that of the front frame 114, thus generating a reaction force to the vibration. Namely, as the battery 122 functions as the "weight" of a dynamic shock absorber, the vibration of the front frame 114 is reduced.

The battery 122 is supported to a position near the front end of the extension frame portion 114F which forms the "body" of the front frame 114 vibration. As described above, since the antivibration rubbers 120 receive and support the battery 122 by receiving and supporting the battery mount 121 from under, the battery 122 can be easily vibrated with the antivibration rubbers 120 acting as its pivot. The fixing tool 123 fixes the battery 122 to the battery mount 121 by being coupled to the battery 122 and also to the battery mount 121. So that, the fixing tool 123 does not present any obstacle in the battery 122 vibration. With these combined, it is possible to allow the battery 122 to effectively provide its function as the weight of the dynamic shock absorber.

Incidentally, in addition to supporting the battery 122 to the front frame 114, a balance weight and/or a fuel tank for the engine can be supported thereto also.

Modified Embodiments of Second Embodiment (1) In the foregoing embodiment, the extension frame portion 114 extends forwardly of the vehicle body from the engine coupling portion 114E. However, it is also possible to employ an arrangement in which the extension frame portion 114 extends rearwardly of the vehicle body from the engine coupling portion 114E.

(2) In the foregoing embodiment, the front frame 114, acting as a "vehicle body frame", is constituted of a pair of right and left frame members 116, thus forming a framework. However, it is also possible to employ a vehicle body frame in the form of a block.

(3) In the foregoing embodiment, the antivibration rubber 120 is employed as the antivibration member. Instead, as the antivibration member various kinds of antivibration member such as a spring may be employed.

(4) In the foregoing embodiment, there was disclosed an example using the antivibration rubber 120 in the form of a block. However, an antivibration rubber in the form of a plate may be employed also.

(5) In the foregoing embodiment, there was disclosed an example in which four antivibration rubbers 120 are provided. However, the number of such antivibration rubbers can be three or less, or five or more.

(6) In the foregoing embodiment, the front wheels 102 and rear wheels 103 were used as a traveling device. However, the traveling device can be a crawler type traveling device, or a traveling device using wheels and mini-crawlers in combination.

(7) In the foregoing embodiment, the work vehicle is a tractor. However, the present invention is applicable also to other work vehicles such as a grass mowing machine, a rice planting machine, etc.

DESCRIPTION OF REFERENCE NUMERALS/MARKS

First Embodiment

1: traveling vehicle body
7: driving section
10: cabin
17: roof portion
20: cabin frame
21: cushion member (cushion rubber)
30: dynamic shock absorbing mechanism
31: weight support member
32: front-facing elastic support member
33: rear-facing elastic support member
34: weight member
34f: front weight member
34r: rear weight member
35: air conditioning duct Second Embodiment

105: engine
114: vehicle body frame (front frame)
114E: engine coupling portion
114F: extension frame portion
120: antivibration member (antivibration rubber)
121: battery mount
122: battery

What is claimed is:

1. A vehicle comprising:
a traveling vehicle body;
a driving section formed on the traveling vehicle body;
a cabin having a cabin frame and covering the driving section;
a cushion member interposed between the traveling vehicle body and the cabin supported to the traveling vehicle body;
wherein the cabin includes a dynamic shock absorbing mechanism having a weight support member transversely supported at an upper portion of the cabin frame and extending along a transverse width of the vehicle body, and a weight member supported at a center portion in the vehicle body transverse width direction of the weight support member; and
the weight support member comprises an elastic member that has a smaller elastic modulus than an elastic modulus of the cabin frame.

2. The work vehicle as defined in claim 1, wherein:
the dynamic shock absorbing mechanism includes:
a front-facing elastic support member extending forwardly along the vehicle body front/rear direction from the center portion in the vehicle body transverse width direction and having a smaller elastic modulus than the elastic modulus of the cabin frame; and
a rear-facing elastic support member extending rearwardly along the vehicle body front/rear direction from the center portion and having a smaller elastic modulus than the elastic modulus of the cabin frame; and
the weight member includes:
a front weight member supported to the center portion via the front-facing elastic support member; and
a rear weight member supported to the center portion via the rear-facing elastic support member.

3. The work vehicle as defined in claim 1, wherein:
the cabin includes a roof portion; and
the dynamic shock absorbing mechanism is accommodated within the roof portion.

4. The work vehicle as defined in claim 3, wherein:
the work vehicle further comprises a pair of right and left air-conditioning ducts accommodated in distribution within opposed sides of the roof portion and extending along the vehicle body front/rear direction; and
the weight member of the dynamic shock absorbing mechanism is accommodated between the pair of right and left air-conditioning ducts in the roof portion.

5. A work vehicle comprising:
an engine;
a vehicle body frame including an engine coupling portion to which the engine is coupled, and an extension frame portion extending forwardly or rearwardly in the vehicle body front/rear direction from the engine coupling portion;
a battery supported to the extension frame portion; and
an antivibration member interposed between the extension frame portion and the battery.

6. The work vehicle as defined in claim 5, wherein
the antivibration member is interposed between the extension frame member and the battery while receiving and supporting the battery from under.

7. The work vehicle as defined in claim 5, further comprising:
a battery mount on which the battery is placed; and
a fixing tool coupled to the battery and also to the battery mount for fixing the battery to the battery mount;
wherein the antivibration member is interposed between the extension frame portion and the battery mount to which the battery is fixed via the fixing tool.

\* \* \* \* \*